UNITED STATES PATENT OFFICE.

ROBERT MOSCHELES, OF BERLIN, GERMANY, ASSIGNOR TO LOUIS H. HALL, OF PHILADELPHIA, PENNSYLVANIA.

GAS-INCANDESCENT.

SPECIFICATION forming part of Letters Patent No. 589,393, dated August 31, 1897.

Application filed September 22, 1896. Serial No. 606,654. (No specimens.)

*To all whom it may concern:*

Be it known that I, ROBERT MOSCHELES, a subject of the German Emperor, residing at Scharrnstrasse, No. 15, in the city of Berlin, Germany, have invented a new and useful Improvement in Gas-Incandescents, of which the following is a specification.

For the preparation of incandescents, according to my experience, only those bodies are useful which are capable of absorbing and giving off oxygen at the temperature of the non-luminous gas-flame. There are a number of such bodies which possess this property and again others which have this action only in the presence of related oxids. To obtain an incandescent light, it is necessary to exhibit these bodies in the finest state of subdivision to the non-luminous flame, and this finest state of subdivision can be produced by embedding these in other refractory oxids. It was necessary to produce an excellent incandescent in the simplest and cheapest manner for me to search for oxids of all above-named kinds. After many unsuccessful trials I found that calcium zirconate, prepared by calcining a mixture of lime and zircon, is a body of very compact structure and at the same time very porous and readily heated to glowing. By embedding in this compound the oxids of the platinum metals by themselves, or, what increases the amount of light, in combination with other oxygen-carriers, like chromium, manganese, erbium, cerium, tungsten, vanadium, &c., we obtain incandescents of great resistance and strong light-producing properties. In like manner it was possible for me to prepare incandescents by the use of the oxygen-carriers alone.

The following formulæ are samples for the preparation of my incandescents: Lime, 26.50 per cent.; zircon, 72.50 per cent.; ruthenium, .20 per cent.; tungsten, .50 per cent.; cobalt, .30 per cent.; or lime, 26.50 per cent.; zircon, 72.50 per cent.; cerium, 1 per cent.

In the manufacture of incandescent-light bodies by the process or method herein described and in the employment of the composition of ingredients herein specified I make use of the method which consists, first, in providing a combustible fabric, then impregnating it with a solution composed of the specified ingredients in proper proportion, and then burning out or drying out the combustible fabric in the ordinary manner for the production of the skeleton of ashes of the oxids. By the application of heat to the impregnated combustible fabric the said fabric is burned out and the calcium zirconate with the oxids of the platinum metals (or other oxygen-carriers when the same are used) embedded therein will remain, forming a skeleton structure of infusible material capable of readily incandescing when heat is applied. It will thus be seen that the calcium zirconate is formed and the oxids embedded in its porous structure by one and the same operation.

Having thus described my invention, what I claim as new, and desire to secure by Letters Patent, is—

1. The herein-described incandescent, containing calcium zirconate.

2. The herein-described incandescent, containing calcium zirconate used as a carrier of the light-producing bodies.

3. An incandescent for use in gas-lighting, consisting of calcium zirconate in combination with the oxids of the platinum metals.

4. An incandescent for gas-lighting, consisting of calcium zirconate in combination with oxygen-carriers like the oxids of chromium, manganese, vanadium, cerium, erbium, tungsten, &c.

5. An incandescent, consisting of the platinum metals, the oxygen-carriers like the oxids of chromium, manganese, &c., and calcium zirconate.

In witness whereof I have hereunto signed my name in the presence of two subscribing witnesses.

ROBERT MOSCHELES.

Witnesses:
   CHARLES H. DAY,
   HENRY HARPER.